US012617289B2

(12) United States Patent
Tanaka et al.

(10) Patent No.: US 12,617,289 B2
(45) Date of Patent: May 5, 2026

(54) CONTROL DEVICE FOR ELECTRIC VEHICLE

(71) Applicant: MITSUBISHI JIDOSHA KOGYO KABUSHIKI KAISHA, Tokyo (JP)

(72) Inventors: Hayate Tanaka, Tokyo (JP); Masahiro Inoue, Tokyo (JP); Hokuto Yokotsuji, Tokyo (JP); Kiyotaka Ishikawa, Tokyo (JP); Hajime Saeki, Tokyo (JP); Yasuaki Kano, Tokyo (JP); Masanori Shinya, Tokyo (JP); Akihiro Tajikara, Tokyo (JP); Satsuki Yagi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 18/843,933

(22) PCT Filed: Jan. 31, 2023

(86) PCT No.: PCT/JP2023/002978
§ 371 (c)(1),
(2) Date: Sep. 4, 2024

(87) PCT Pub. No.: WO2023/166897
PCT Pub. Date: Sep. 7, 2023

(65) Prior Publication Data
US 2025/0214445 A1 Jul. 3, 2025

(30) Foreign Application Priority Data
Mar. 4, 2022 (JP) ................................. 2022-033195

(51) Int. Cl.
*B60L 15/20* (2006.01)
(52) U.S. Cl.
CPC ........... *B60L 15/20* (2013.01); *B60L 2240/54* (2013.01)

(58) Field of Classification Search
CPC .. B60L 15/20; B60L 2240/54; B60L 2240/80; B60L 7/18; B60L 58/15;
(Continued)

(56) References Cited

U.S. PATENT DOCUMENTS 8,818,603 B2 * 8/2014 Kinoshita ............. B60W 20/00
701/22
2009/0118877 A1 5/2009 Center et al.
(Continued)

FOREIGN PATENT DOCUMENTS

JP 2011-223698 A 11/2011
JP 2016-46919 A 4/2016
(Continued)

OTHER PUBLICATIONS

Indian Office Action for Indian Application No. P00202408840, dated Aug. 22, 2025, with English translation.
(Continued)

*Primary Examiner* — Jason Holloway
*Assistant Examiner* — Madison B Emmett
(74) *Attorney, Agent, or Firm* — Birch, Stewart, Kolasch & Birch, LLP

(57) ABSTRACT

In a control device for an electric vehicle, a setting unit sets, as a maximum value of power capable of being charged into the battery, a short time SOP applied during charging in which a charging time is equal to or less than a predetermined time and a long time SOP applied during charging in which the charging time exceeds the predetermined time. A calculation unit calculates a regeneration SOP corresponding to a maximum value of regeneration power from the motor based on the short time SOP and the long time SOP. A control unit controls the regeneration power from the motor in a range equal to or less than the regeneration SOP. The calculation unit gradually changes the regeneration SOP
(Continued)

from the short time SOP to the long time SOP in accordance with a duration time of the regeneration power generation.

6 Claims, 4 Drawing Sheets

(58) Field of Classification Search
CPC .......... B60W 20/11; B60W 30/18127; B60W 2050/0025; B60W 2510/242; B60W 2510/244; B60W 2510/246; B60W 2520/10; B60W 2710/248; B60W 20/14; H01M 10/05; H01M 10/0525; H01M 2220/20; H01M 10/48; H01M 10/44; B60K 6/442; Y02T 10/70
See application file for complete search history.

(56) References Cited

U.S. PATENT DOCUMENTS

| | | | | |
|---|---|---|---|---|
| 2015/0127280 | A1* | 5/2015 | Baba | G01R 31/3842 702/63 |
| 2018/0050602 | A1* | 2/2018 | Aronov | B60L 58/13 |
| 2019/0044367 | A1* | 2/2019 | Koike | H02J 7/1423 |
| 2019/0126771 | A1* | 5/2019 | Sato | B60W 10/26 |
| 2019/0296337 | A1* | 9/2019 | Yasuda | B60L 50/64 |
| 2021/0265856 | A1* | 8/2021 | Nishikawa | H01M 10/44 |
| 2023/0249580 | A1* | 8/2023 | Osawa | H02J 7/007182 320/109 |
| 2024/0010085 | A1* | 1/2024 | Ohn | B60L 58/13 |
| 2024/0151774 | A1* | 5/2024 | Osada | H02J 7/0047 |
| 2024/0177544 | A1* | 5/2024 | Matsuda | H01M 10/425 |
| 2024/0416918 | A1* | 12/2024 | Terai | B60L 50/61 |
| 2025/0001890 | A1* | 1/2025 | Taniguchi | B60L 3/0046 |
| 2025/0065776 | A1* | 2/2025 | Osada | H02J 7/0014 |

FOREIGN PATENT DOCUMENTS

| | | |
|---|---|---|
| JP | 2017-165373 A | 9/2017 |
| JP | 2018-016235 A | 2/2018 |

OTHER PUBLICATIONS

International Search Report for PCT/JP2023/002978 (PCT/ISA/210) mailed on Apr. 18, 2023.

Written Opinion of the International Searching Authority for PCT/JP2023/002978 (PCT/ISA/237) mailed on Apr. 18, 2023.

Indonesian Office Action for Indonesian Application No. P00202408840, dated Aug. 22, 2025, with English translation.

Extended European Search Report issued Jan. 29, 2026 in corresponding European Application 23763159.3.

* cited by examiner

CONTROL DEVICE FOR ELECTRIC VEHICLE

TECHNICAL FIELD

The present disclosure relates to a control device for an electric vehicle on which a motor is mounted.

BACKGROUND ART

In the related art, in regeneration power generation of a motor mounted on an electric vehicle, control for limiting regeneration power in consideration of power chargeable to a battery at that time point is known. In this type of control, the regeneration power is set to be relatively small on the assumption that a duration time of the regeneration power generation may be a long time. In contrast, when the duration time of the regeneration power generation is a short time, the regeneration power may be set to be relatively large. With such a setting, it is possible to increase the regeneration power while preventing electrodeposition or deterioration due to overvoltage of the battery (for example, see Patent Literature 1).

CITATION LIST

Patent Literature

Patent Literature 1: JP2011-223698A

SUMMARY OF INVENTION

Technical Problem

In the above-described control, regeneration control is ended when a regeneration time exceeds a predetermined time. For example, in the technique of Patent Literature 1, when initial regeneration power is power Pa and the regeneration time exceeds a time A, the regeneration power is decreased toward 0 with a steep gradient (see FIG. 9). However, the electrodeposition or deterioration of the battery may be prevented even if the regeneration power is not immediately reduced to 0 immediately after the regeneration time exceeds the time A. In the existing control, the regeneration power is excessively prevented and energy losses are large, and thus it is difficult to improve power consumption.

An object of the present disclosure is to provide a control device for an electric vehicle capable of improving power consumption in regeneration power generation. It is to be noted that the present disclosure is not limited to this object, and that it is also possible to achieve an operational effect derived from each configuration described in "DESCRIPTION OF EMBODIMENTS" to be described later, which is not obtained by the technique of the related art, as another object of the present disclosure.

Solution to Problem

A disclosed control device for an electric vehicle can be realized by aspects or application examples disclosed below, and solves at least a part of the above problems.

The disclosed control device for an electric vehicle is a control device for an electric vehicle on which a motor is mounted, the motor having both a function of driving wheels with power of a battery and a function of charging the battery with power generated by regeneration power generation. The control device includes: a setting unit that sets, as a maximum value of power capable of being charged into the battery, a short time SOP applied during charging in which a charging time is equal to or less than a predetermined time and a long time SOP applied during charging in which the charging time exceeds the predetermined time and having a value smaller than the short time SOP; a calculation unit that calculates a regeneration SOP corresponding to a maximum value of regeneration power from the motor based on the short time SOP and the long time SOP; and a control unit that controls the regeneration power from the motor in a range equal to or less than the regeneration SOP. In addition, the calculation unit executes a transition calculation of gradually changing the regeneration SOP from the short time SOP to the long time SOP in accordance with a duration time of the regeneration power generation.

Advantageous Effects of Invention

According to the control device for the electric vehicle of the present disclosure, by gradually changing the regeneration SOP from the short time SOP to the long time SOP, the regeneration power from the motor can be increased while satisfying an electrodeposition protection requirement of the battery, and power consumption can be improved in the regeneration power generation of the electric vehicle. In addition, since switching from the short time SOP to the long time SOP becomes smooth, it is possible to improve travel feeling during the regeneration power generation.

DESCRIPTION OF EMBODIMENTS

The control device for an electric vehicle of the present disclosure may be implemented by the following embodiments.

Embodiment

[1. Device Configuration]

Figure 1:
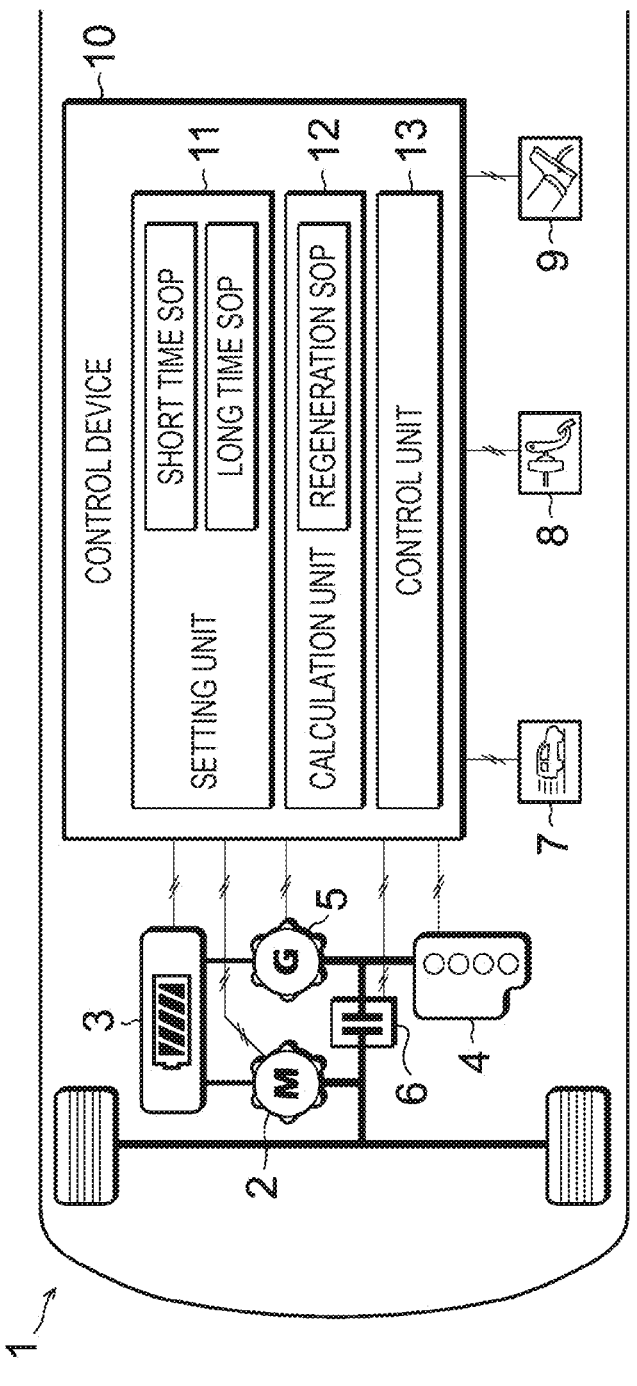
FIG. 1 is a block diagram showing an electric vehicle and a control device thereof.

FIG. 1 is a block diagram showing a configuration of a control device 10 according to an embodiment and an electric vehicle 1 (hereinafter, also simply referred to as a vehicle 1) to which the control device 10 is applied. Specific examples of the vehicle 1 include an electric vehicle, a hybrid vehicle, a plug-in hybrid vehicle, and the like. At least a motor 2 as a drive source and a battery 3 as a power source are mounted on the vehicle 1. The battery 3 is a secondary battery such as a lithium-ion secondary battery or a nickel-hydrogen battery.

The motor 2 is a motor generator (electric motor and electrical generator) having both a function of driving wheels with power of the battery 3 and a function of charging the battery 3 with power generated by regeneration power generation. The wheels (drive wheels) driven by the motor 2 may be front wheels, rear wheels, or all wheels. The number of motors 2 mounted and the number of drive wheels are not limited. One drive wheel may be driven by one motor 2, a plurality of drive wheels may be driven by one motor 2, one drive wheel may be driven by a plurality of motors 2, or a plurality of drive wheels may be driven by a plurality of motors 2. Further, a transmission mechanism (not shown) may be interposed on a power transmission path connecting the motor 2 and the drive wheels.

The vehicle 1 shown in FIG. 1 is a hybrid vehicle (a hybrid electric vehicle, HEV) or a plug-in hybrid vehicle (a plug-in hybrid electric vehicle, PHEV) in which an engine 4 is mounted as a second drive source and a generator is mounted 5 as a power generator. The hybrid vehicle is a vehicle on which the engine 4 and the motor 2 are mounted as drive sources. The plug-in hybrid vehicle is a hybrid vehicle capable of externally charging the battery 3 or externally supplying power from the battery 3. The plug-in hybrid vehicle is provided with a charging port (inlet) for inserting a charging cable into which power is supplied from an external charging facility, and an external power supply outlet (outlet) for inserting a power supply cable for supplying power to an external device.

The engine 4 is an internal combustion engine such as a gasoline engine or a diesel engine. The generator 5 (electrical generator) having at least a function of generating power using a driving force of the engine 4 is coupled to a drive shaft of the engine 4. The generated power (generated output) of the generator 5 is used to drive the motor 2 or charge the battery 3. The transmission mechanism (not shown) can be interposed on a power transmission path connecting the engine 4 and the generator 5. The generator 5 having both a function as an electric motor for causing the vehicle 1 to travel may be applied.

A clutch 6 is interposed on a power transmission path connecting the motor 2 and the engine 4. The engine 4 is connected to the drive wheels via the clutch 6, and the motor 2 is arranged closer to a drive wheel side than the clutch 6. The generator 5 is connected to an engine 4 side with respect to the clutch 6. When the clutch 6 is disengaged (released), the engine 4 and the generator 5 are disconnected from the drive wheels, and the motor 2 is connected to the drive wheels. Accordingly, for example, by operating only the motor 2, so-called EV traveling (single motor traveling) is realized. In addition, by operating the engine 4 to cause the generator 5 to generate power, so-called series traveling is realized.

Meanwhile, when the clutch 6 is connected (fastened), the motor 2, the engine 4, and the generator 5 are connected to the drive wheels. Accordingly, for example, by operating only the engine 4, so-called ENG traveling (single engine traveling) is realized. In addition, by driving the motor 2 and the generator 5, so-called parallel traveling is realized. The vehicle 1 may be a hybrid vehicle capable of EV traveling at least, and other traveling modes (ENG traveling, series traveling, and parallel traveling) may be appropriately omitted.

Operation states of the motor 2, the battery 3, the engine 4, the generator 5, and the clutch 6 are controlled by the control device 10. The control device 10 is a computer (electronic control unit, ECU) having at least a function of controlling regeneration power from the motor 2. The control device 10 incorporates a processor (calculation processing device) and a memory (storage device). A content (control program) of the control performed by the control device 10 is stored in the memory and is executed by being appropriately read into the processor.

A vehicle speed sensor 7, a brake sensor 8, and an accelerator sensor 9 are connected to the control device 10. The vehicle speed sensor 7 is a sensor that detects a traveling speed (vehicle speed) of the vehicle 1. The brake sensor 8 is a sensor that detects parameters (a brake opening degree, a brake pedal stroke, a brake fluid pressure, and the like) corresponding to a depression amount of a brake pedal. The accelerator sensor 9 is a sensor that detects parameters (accelerator opening degree, accelerator pedal stroke, throttle opening degree, and the like) corresponding to a depression amount of an accelerator pedal. Information detected by each of the sensors 7 to 9 is transmitted to the control device 10.

Examples of the other information transmitted to the control device 10 include information on the operation state (a rotation speed, a motor temperature, a drive current, a drive voltage, a drive frequency, and the like) of the motor 2, information on the operation state (a state of charge SOC, a state of health SOH, an input and output current, a battery voltage, a battery temperature, an internal resistance, and the like) of the battery 3, and information on a traveling state of the vehicle 1 (a traveling mode, an outside air temperature, and the like). The control device 10 of the present embodiment performs control for more flexibly changing the regeneration power from the motor 2 than the existing control by using various information as described above. The state of charge SOC of the battery 3 can be calculated based on the input and output current and the battery voltage.

[2. Control Configuration]

The control device 10 is provided with a setting unit 11, a calculation unit 12, and a control unit 13 as elements for performing the above-described control. These elements are shown by classifying the functions of the control device 10 for convenience, and may be realized by software (program) or hardware (electronic control circuit). These elements may be integrated into one piece of software or hardware, or may be distributed into a plurality of pieces of software and hardware. For example, these elements may be incorporated in a motor ECU (MCU, motor control unit) for managing the motor 2, may be incorporated in a battery ECU (BMU, battery management unit) for managing the battery 3, or may be distributed to a plurality of ECUs.

The setting unit 11 sets a short time SOP (short time chargeable maximum power, short time State Of Power) and a long time SOP (long time chargeable maximum power, long time State Of Power) as a maximum value of the power [KW] chargeable to the battery 3. The short time SOP is a maximum power applied during charging in which a charging time is equal to or less than a predetermined time C (relatively short time). A scale of the predetermined time C (a degree of time length) to which the short time SOP is applied is assumed to be, for example, about several seconds. In contrast, the long time SOP is the maximum power applied during charging in which the charging time exceeds the predetermined time C, and the value thereof is set to be smaller than the short time SOP. The long time SOP is a parameter corresponding to, for example, a rated input power of the general battery 3.

Each value of the short time SOP and the long time SOP may be a fixed value set in advance, or may be a variable value set in accordance with the operation state (the state of charge SOC, the state of health SOH, a regeneration current amount, the battery voltage, the battery temperature, and the like) of the battery 3 or the traveling state (the traveling mode, the vehicle speed, the outside air temperature, the accelerator opening degree, and the like) of the vehicle 1. The same applies to the predetermined time C during which the short time SOP can be used, and the predetermined time C may be a fixed value set in advance, or may be a variable value set according to the operation state of the battery 3 or the traveling state of the vehicle 1. For example, the predetermined time C may be set based on a charging current (regeneration current amount) to the battery 3 or the battery voltage. The short time SOP and the long time SOP are set on the premise that the motor 2 is operating at least. The short time SOP and the long time SOP of the present embodiment may be set on the premise that the motor 2 performs the regeneration power generation because the motor 2 is used during the regeneration power generation.

Figure 2:
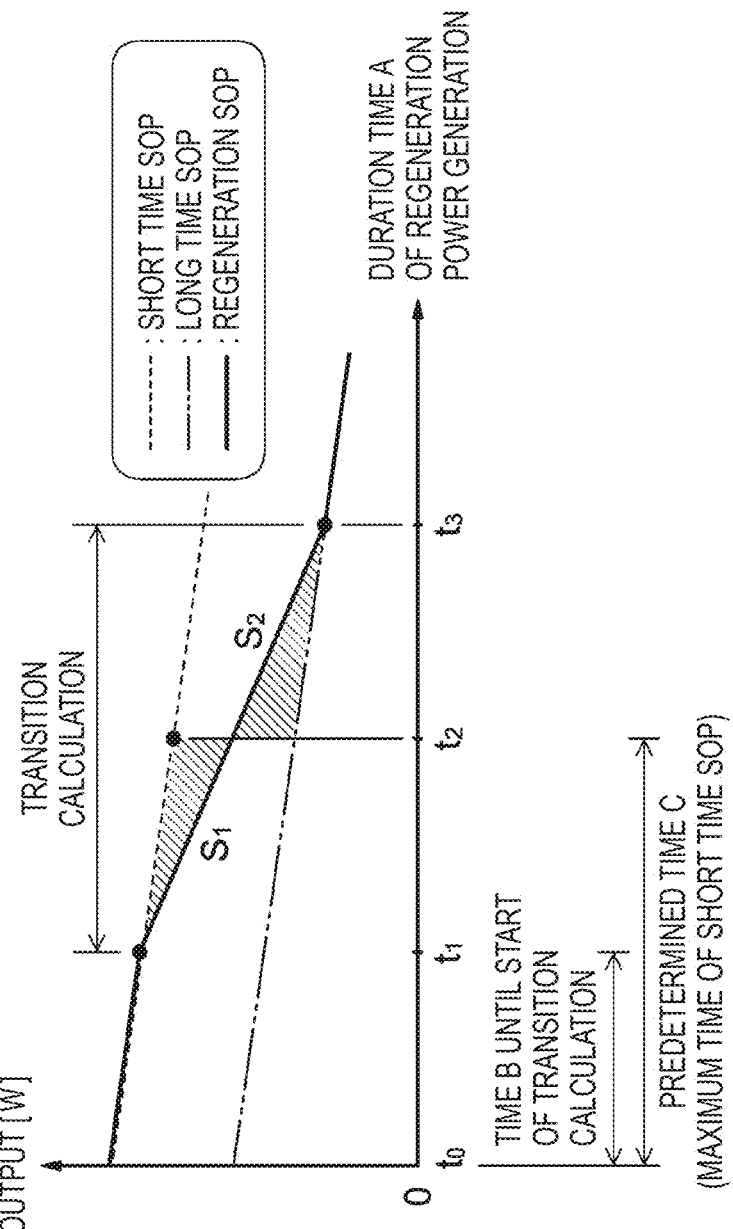
FIG. 2 is a graph showing temporal changes in a short time SOP and a long time SOP during regeneration power generation of a motor.

FIG. 2 is a graph showing temporal changes in the short time SOP and the long time SOP during the regeneration power generation of the motor 2. In this example, the values of the short time SOP and the long time SOP change linearly and in parallel. In the setting unit 11, both values of the short time SOP and the long time SOP are normally set during the regeneration power generation of the motor 2. The value of the long time SOP (two-dot chain line graph) is set to a value smaller than the value of the short time SOP (broken line graph) at that time point. In addition, as a duration time A of the regeneration power generation becomes longer, the state of charge of the battery 3 increases to a state close to full charge. Therefore, the values of the short time SOP and the long time SOP are set to decrease as the duration time A of the regeneration power generation becomes longer, and the graph of the short time SOP and the long time SOP shown in FIG. 2 becomes a downward gradient.

A time point t2 in FIG. 2 is a time point when a predetermined time C (the maximum time of the short time SOP) is elapsed since the regeneration power generation of the motor 2 is started. In the control in the related art, since it is not assumed to use the short time SOP exceeding the predetermined time C, it is not necessary to set the short time SOP after the time point t2. On the other hand, in the present embodiment, as long as the motor 2 is operating, the setting of the value of the short time SOP continues even after the time point t2, and is referred to for calculation of the regeneration SOP. However, after it is not necessary to reflect the value of the short time SOP in the value of the regeneration SOP described below (after time point t3 in FIG. 2), the setting of the value of the short time SOP may be omitted.

The calculation unit 12 calculates the regeneration SOP corresponding to a maximum value of the regeneration power from the motor 2 based on the short time SOP and the long time SOP set by the setting unit 11. Here, a transition calculation is performed to gradually change the regeneration SOP from the short time SOP to the long time SOP according to the duration time A of the regeneration power generation. At the start of the regeneration power generation (a time point to in FIG. 2), the value of the short time SOP is calculated as a value of the regeneration SOP. Thereafter, when a time B (time B until start of the transition calculation) elapses from the start of the regeneration power generation (a time point t₁ in FIG. 2), the transition calculation is started. The time B is set shorter than the predetermined time C as shown in FIG. 2. Accordingly, the value of the regeneration SOP starts to decrease toward the long time SOP before the charging time of the battery 3 by the regeneration power generation reaches the predetermined time C.

In the above transition calculation, the calculation unit 12 of the present embodiment can perform calculation of linearly changing a ratio of the short time SOP or a ratio of the long time SOP reflected in the regeneration SOP with respect to the duration time A of the regeneration power generation. For example, the calculation unit 12 calculates the regeneration SOP based on the following Equation 1 or 2. A transition time D in Equations 1 and 2 is a time based on the time point at which the transition calculation is started (execution time of the transition calculation), and corresponds to a time obtained by subtracting the time B from the duration time A of the regeneration power generation (time based on the time point at which the regeneration power generation is started).

$$\text{regeneration } SOP = \qquad\qquad\qquad \text{Equation 1}$$
$$(1 - k_1) \times (\text{short time } SOP) + k_1 \times (\text{long time } SOP)$$
$$(k_1\text{:a multiplication coefficient for reduction increasing}$$
$$\text{in proportion to the transition time } D, 0 \leqq k_1 \leqq 1)$$

$$\text{regeneration } SOP = \qquad\qquad\qquad \text{Equation 2}$$
$$k_2 \times (\text{short time } SOP) + (1 - k_2) \times (\text{long time } SOP)$$
$$(k_2\text{:a multiplication coefficient for reduction decreasing}$$
$$\text{in proportion to the transition time } D, 0 \leqq k_2 \leqq 1)$$

Figure 3:
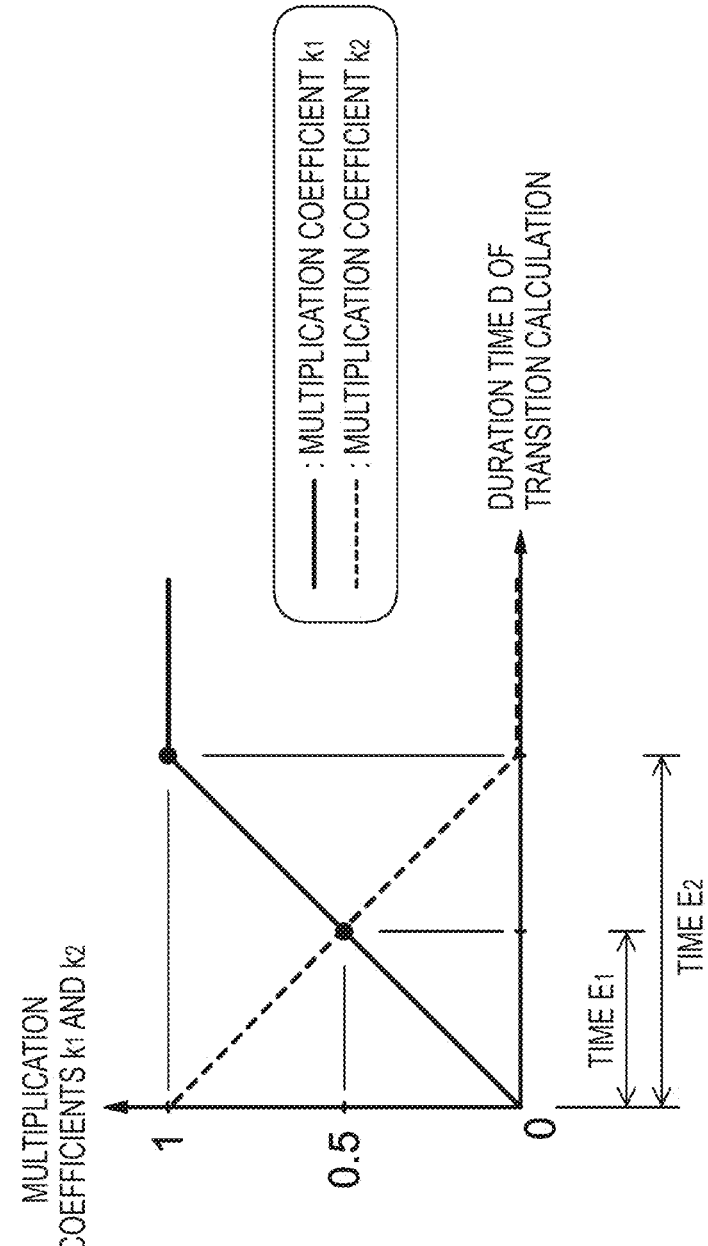
FIG. 3 is a graph showing a relation between a duration time of a transition calculation and a multiplication coefficient for reduction.

The multiplication coefficient for reduction $k_1$ in Equation 1 is a coefficient that increases from 0 to 1 in proportion to the transition time D of the transition calculation. A solid line in FIG. 3 is a graph showing a relation between the transition time D of the transition calculation and the multiplication coefficient for reduction $k_1$. In this example, the value of the multiplication coefficient for reduction $k_1$ is set to 0.5 when the transition time D is a time $E_1$, and the value of the multiplication coefficient for reduction $k_1$ is set to 1 when the transition time D is a time $E_2$ or more. The multiplication coefficient for reduction $k_2$ in Equation 2 is a coefficient that decreases from 1 to 0 in proportion to the transition time D. A broken line in FIG. 3 is a graph showing a relation between the transition time D of the transition calculation and the multiplication coefficient for reduction $k_2$. The time $E_2$ in FIG. 3 is a time twice the time $E_1$, and corresponds to a time from the time point $t_1$ to the time point $t_3$ in the graph of FIG. 2. After the time point $t_3$, the ratio of the short time SOP reflected in the regeneration SOP is 0, and the value of the long time SOP is calculated as the value of the regeneration SOP. The time $E_1$ is a time until the multiplication coefficients for reduction $k_1$ and $k_2$ change to 0.5 in the transition calculation. The time $E_2$ is the time until the change of the multiplication coefficients for reduction $k_1$ and $k_2$ stops in the transition calculation.

Strictly speaking, the multiplication coefficient for reduction $k_2$ is not "in proportion" to the transition time D (in a mathematical sense). A value "in proportion" to the transition time D is a value obtained by subtracting 1 from the multiplication coefficient for reduction $k_2$. When it is desired to understand the relation between the multiplication coefficient for reduction $k_2$ and the transition time D in accordance with a stricter definition, the value obtained by subtracting 1 from the multiplication coefficient for reduction $k_2$ may be defined as a "multiplication coefficient for reduction $k_3$", and the "multiplication coefficient for reduction $k_3$" may be considered to decrease from 0 to −1 in proportion to the transition time D.

In relation to characteristics of the multiplication coefficients for reduction $k_1$ and $k_2$, graph shapes of the multiplication coefficients for reduction $k_1$ and $k_2$ are preferably set such that a time obtained by subtracting the time B from the predetermined time C and the time $E_1$ are matched. That is, it is preferable that the ratio of the short time SOP reflected in the regeneration SOP and the ratio of the long time SOP reflected in the regeneration SOP are matched (both are set to 50%) at a time point when the duration time A of the regeneration power generation reaches the predetermined time C. In other words, it is preferable to determine the characteristics of the multiplication coefficient for reduction $k_1$ so that the regeneration SOP becomes an intermediate value (average value) between the short time SOP and the long time SOP when the duration time A of the regeneration power generation reaches the predetermined time C.

Accordingly, a triangular shape of a hatched portion between the time points $t_1$ to $t_2$ in FIG. 2 is congruent with a triangular shape of a hatched portion between the time points $t_2$ to $t_3$. In other words, a hatching area $S_1$ between the time points $t_1$ to $t_2$ matches a hatching area S2 between the time points $t_2$ to $t_3$. The hatching area $S_1$ corresponds to an excess chargeable power amount [Wh] generated by reducing the regeneration SOP more than the short time SOP between the time points $t_1$ to $t_2$. The hatching area S2 corresponds to a chargeable power amount [Wh] required to increase the regeneration SOP more than the long time SOP between the time points $t_2$ to $t_3$.

By matching the two areas (two power amounts), excess or deficiency of the chargeable power amount is canceled out. Accordingly, the regeneration power from the motor 2 can be maximized within a range in which an electrodeposition protection requirement of the battery 3 is satisfied. In addition, as compared with the case in which the regeneration SOP is changed discontinuously (stepwise) from the short time SOP to the long time SOP at the time point $t_2$, fluctuation of the regeneration power becomes smooth, and a travel feeling of the vehicle becomes good.

When calculating the regeneration SOP in the calculation unit 12, the time B until the start of the transition calculation from the start of the regeneration power generation may be a fixed value (for example, several seconds) set in advance, or may be a variable value set according to the operation state (the state of charge SOC, the state of health SOH, the regeneration current amount, the battery voltage, the battery temperature, and the like) of the battery 3 or the traveling state (the traveling mode, the vehicle speed, the outside air temperature, the accelerator opening degree, and the like) of the vehicle 1. Similarly, a time change rate of each of the multiplication coefficients for reduction $k_1$ and $k_2$ (that is, a time change rate of the regeneration SOP during the transition calculation) may be a fixed value set in advance, or may be a variable value set in accordance with the operation state of the battery 3 or the traveling state of the vehicle 1.

The control unit 13 controls the regeneration power from the motor 2 using the regeneration SOP calculated by the calculation unit 12. The control unit 13 controls the operation state of the motor 2 (or an inverter (not shown)) so that the regeneration power from the motor 2 becomes equal to or lower than the regeneration SOP. Accordingly, a regeneration braking force is generated in the drive wheels connected to the motor 2, and the battery 3 is charged with the regeneration power. A frictional braking force is applied to the drive wheels via a brake mechanism (not shown) in accordance with a magnitude of a braking force (braking torque) required by a driver.

[3. Flowchart]

Figure 4:
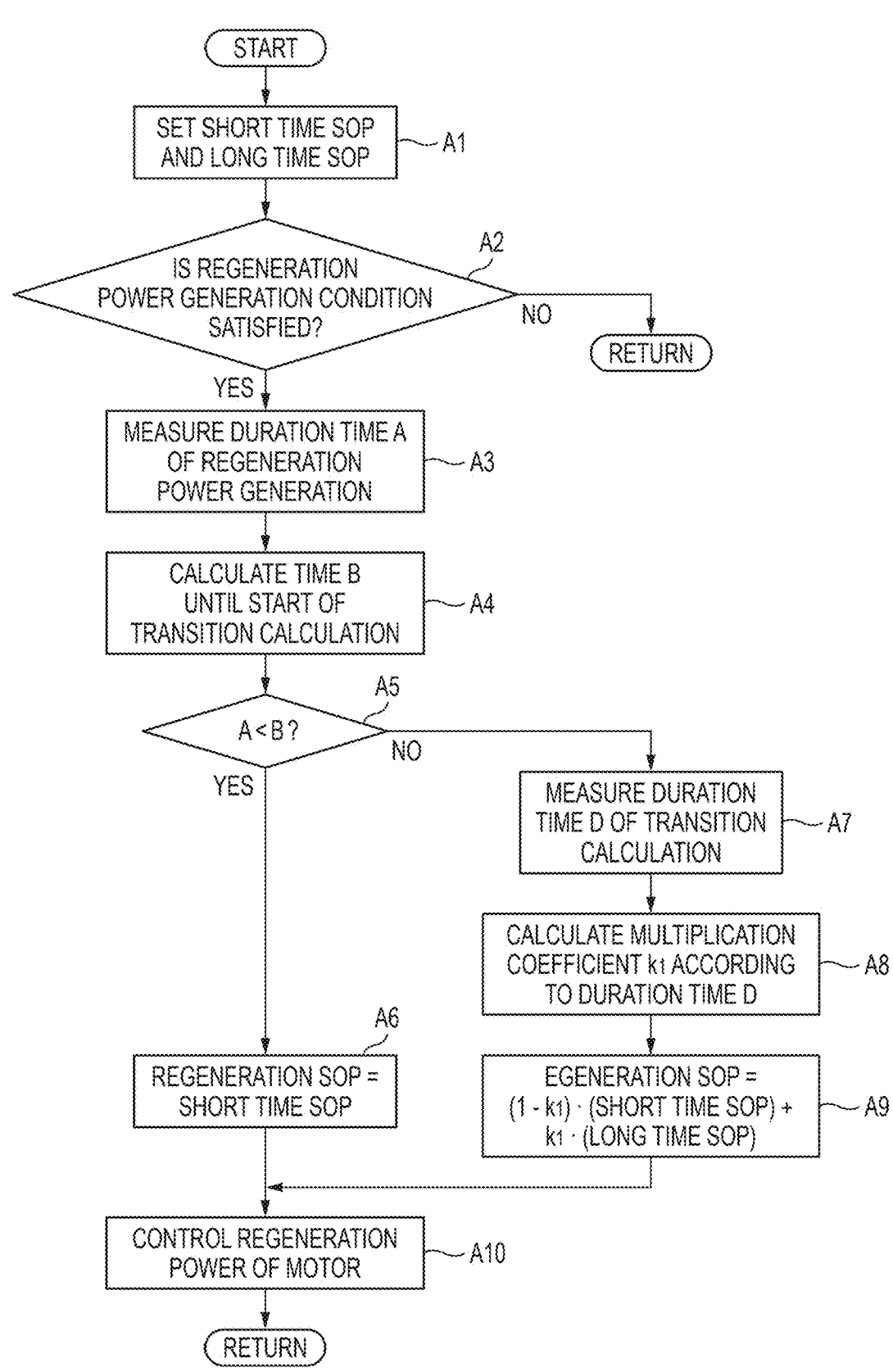
FIG. 4 is an example of a flowchart of control related to the transition calculation during the regeneration power generation.

FIG. 4 is an example of a flowchart of the control related to the transition calculation during the regeneration power generation. The control shown in this flowchart is repeatedly executed in the control device 10 at a predetermined cycle in a situation in which the motor 2 is operating (for example, in the EV traveling mode or the hybrid traveling mode). The control shown in this flowchart can be performed on at least the vehicle 1 having a traveling mode in which the motor 2 operates, and presence or absence of the engine 4, the generator 5, the clutch 6, and the like is not limited.

In step A1, the setting unit 11 of the control device 10 sets the short time SOP and the long time SOP. The short time SOP and the long time SOP are set according to the operation state (the state of charge SOC, the state of health SOH, the regeneration current amount, the battery voltage, the battery temperature, and the like) of the battery 3 or the traveling state (the traveling mode, the vehicle speed, the outside air temperature, the accelerator opening degree, and the like) of the vehicle 1. The value of the long time SOP is set to be smaller than the short time SOP.

In step A2, whether a regeneration power generation condition for causing the motor 2 to perform the regeneration power generation is satisfied is determined. The regeneration power generation condition includes various known conditions, for example, a decrease in the accelerator opening degree, an increase in the brake opening degree, a state in which the battery 3 can be charged (the state of charge SOC is equal to or lower than a predetermined value, the state of health SOH is equal to or higher than a predetermined value, and the battery temperature is within an appropriate range), a state in which the vehicle 1 is not stopped (the vehicle speed is not 0), and the like. When the regeneration power generation condition is not satisfied (No in step A2), the control in this cycle is ended. Meanwhile, when the regeneration power generation condition is satisfied (Yes in step A2), the control proceeds to step A3.

In step A3, the duration time A of the regeneration power generation is measured. The duration time A is an elapsed time from a time point when the regeneration power generation condition is satisfied for the first time in step A2. In step A4, the time B until the start of the transition calculation is calculated. The time B is set shorter than the predetermined time C (the maximum time of the short time SOP). In subsequent step A5, whether the duration time A of the regeneration power generation is shorter than the time B is determined. When this condition is satisfied (Yes in step A5), the control proceeds to step A6, and the value of the short time SOP in the calculation unit 12 is substituted into the regeneration SOP. Thereafter, in step A10, the control unit 13 controls the regeneration power from the motor 2 in a range equal to or lower than the regeneration SOP. The control of a route indicated as "Yes" subsequent to step A5 corresponds to the control between the time points $t_0$ to $t_1$ in FIG. 2.

When the duration time A of the regeneration power generation becomes equal to or longer than the time B and the condition of step A5 is not satisfied (No in step A5), the control proceeds to step A7. In step A7, the transition time D of the transition calculation is measured. The transition time D is an elapsed time from a time point when the regeneration power generation condition is satisfied for the first time in step A5. In step A8, the calculation unit 12 calculates a multiplication coefficient for reduction $k_1$ according to the transition time D. The multiplication coefficient for reduction $k_1$ is calculated so as to linearly increase with respect to the transition time D, for example, as in the solid line graph in FIG. 3.

In subsequent step A9, the calculation unit 12 calculates the regeneration SOP based on the above Equation 1. The value of the regeneration SOP is calculated so as to gradually transit from the short time SOP to the long time SOP as the transition time D increases. Thereafter, in step A10, the control unit 13 controls the regeneration power from the motor 2 in a range equal to or lower than the regeneration SOP. The control of a route indicated as "No" subsequent to step A5 corresponds to the control after the time point t₁ in FIG. 2.

[4. Effects]

(1) The control device 10 (control device for an electric vehicle) includes the setting unit 11, the calculation unit 12, and the control unit 13. The setting unit 11 sets, as the maximum value of the power that can be charged into the battery 3, the short time SOP applied during the charging in which the charging time is equal to or less than the predetermined time and the long time SOP applied during the charging in which the charging time exceeds the predetermined time C and having a value smaller than the short time SOP. The calculation unit 12 calculates the regeneration SOP corresponding to the maximum value of the regeneration power from the motor 2 based on the short time SOP and the long time SOP. The control unit 13 controls the regeneration power from the motor 2 in the range equal to or less than the regeneration SOP. In addition, the calculation unit 12 executes the transition calculation of gradually changing the regeneration SOP from the short time SOP to the long time SOP in accordance with the duration time A of the regeneration power generation.

As described above, by gradually changing the regeneration SOP from the short time SOP to the long time SOP, the regeneration power is not excessively prevented, and the regeneration power from the motor 2 can be increased while satisfying the electrodeposition protection requirement of the battery 3. Accordingly, it is possible to improve power consumption in the regeneration power generation of the vehicle 1. In addition, since switching from the short time SOP to the long time SOP becomes smooth, it is possible to improve travel feeling during the regeneration power generation.

(2) As shown in FIG. 2, the calculation unit 12 starts the transition calculation before the duration time A of the regeneration power generation reaches the predetermined time C. In this way, by making the regeneration SOP shorter than the short time SOP before the predetermined time C elapses, the regeneration SOP after the predetermined time C elapses can be made longer than the long time SOP. That is, as compared with a case in which the regeneration SOP is set to the same value as the short time SOP until the predetermined time C elapses and the regeneration SOP is set to the same value as the long time SOP after the predetermined time C elapses, it is possible to prevent a sudden change in the regeneration SOP without changing a total power amount charged in the battery 3. Accordingly, the travel feeling can be further improved while satisfying the electrodeposition protection requirement of the battery 3.

(3) As shown in FIG. 3, the calculation unit 12 can perform the calculation of linearly changing the ratio of the short time SOP or the ratio of the long time SOP reflected in the regeneration SOP with respect to the transition time D of the regeneration power generation. For example, the multiplication coefficient for reduction k₁ indicated by the solid line in FIG. 3 has a characteristic of increasing from 0 in proportion to the transition time D. In this way, by linearly changing the ratio of the short time SOP and the ratio of the long time SOP reflected in the regeneration SOP, the regeneration SOP can be changed smoothly, and the travel feeling can be further improved.

(4) The calculation unit 12 can calculate the regeneration SOP based on the following Equation 1.

$$\text{regeneration } SOP = \qquad\qquad \text{Equation 1}$$
$$(1-k_1)\times(\text{short time } SOP) + k_1 \times (\text{long time } SOP)$$

$(k_1$:a multiplication coefficient for reduction increasing in proportion to the transition time $D, 0 \leq k_1 \leq 1)$ By using such a simple calculation formula, the regeneration SOP that smoothly changes can be quickly and easily calculated, and the travel feeling can be further improved.

(5) The calculation unit 12 can set the time B from the start of the regeneration power generation until the start of the transition calculation and the time change rate of the multiplication coefficient for reduction k₁ as variable values according to the operation state of the battery 3 and the traveling state of the vehicle 1. Accordingly, a length of an execution period of the transition calculation can be changed according to the state of the vehicle 1 or the battery 3, and balance between an improvement degree of the power consumption and an improvement degree of the travel feeling can be easily adjusted.

For example, when there is a possibility that the regeneration power generation is continued for a relatively long time, the time B may be set to be short (away from the predetermined time C), and the time change rate of the multiplication coefficient for reduction k₁ may be set to be relatively small. In this way, since the execution period of the transition calculation becomes longer by starting the transition calculation earlier, the regeneration SOP can be gently changed. However, as the execution period of the transition calculation becomes longer, the regeneration power generation is more likely to be terminated in the middle of the execution period, and thus the improvement effect of the power consumption cannot be necessarily maximized.

Conversely, when there is a possibility that the regeneration power generation ends in a relatively short time, the time B may be set to be long (close to the predetermined time C), and the time change rate of the multiplication coefficient for reduction k₁ may be set to be relatively large. In this way, since the execution period of the transition calculation is shortened by starting the transition calculation late, the regeneration SOP can be quickly changed, and the improvement effect of the power consumption can be maximized more reliably.

(6) When the duration time A of the regeneration power generation reaches the predetermined time C, the calculation unit 12 can perform the transition calculation for matching the ratio of the short time SOP reflected in the regeneration SOP and the ratio of the long time SOP reflected in the regeneration SOP. For example, the graph shapes of the multiplication coefficients for reduction k₁ and k₂ are set such that the time E₁ shown in FIG. 3 matches the time obtained by subtracting the time B from the predetermined time C. Accordingly, when the duration time A of the regeneration power generation reaches the predetermined time C, the ratio of the short time SOP reflected in the regeneration SOP and the ratio of the long time SOP reflected in the regeneration SOP both become 50%.

Here, in FIG. 2, when it is assumed that the graphs of the short time SOP and the long time SOP are both straight and parallel, the triangular shape of the hatched portion of the time points $t_1$ to $t_2$ becomes congruent with the triangular shape of the hatched portion of the time points $t_2$ to $t_3$. The area $S_1$ of the former triangular shape is equal to the area S2 of the latter triangular shape. Accordingly, as compared with the case in which the regeneration SOP is discontinuously (stepwise) changed from the short time SOP to the long time SOP at the time point $t_2$, it is possible to smoothly change the regeneration SOP without suddenly changing the regeneration SOP while ensuring the same chargeable power amount. Accordingly, the travel feeling can be further improved.

[5. Others]

The above embodiment is merely an example, and is not intended to exclude various modifications and applications of techniques not explicitly described in the present embodiment. Each configuration of the present embodiment can be variously modified and implemented without departing from the gist thereof. In addition, each configuration of the present embodiment can be selected as necessary, or can be combined as appropriate.

In the above embodiment, the control device 10 in the hybrid vehicle on which the motor 2 as the drive source and the engine 4 are mounted is described in detail, but the control device 10 may be applied to the vehicle 1 other than the hybrid vehicle. Further, the temporal changes of the output and the characteristics of the multiplication coefficient for reduction as shown in FIGS. 2 and 3 can be appropriately changed. By applying the above-described control device 10 to the vehicle 1 on which the motor 2 is mounted, the same control as in the above-described embodiment can be realized, and the same effect as in the above-described embodiment can be obtained.

Although various embodiments have been described above with reference to the drawings, the present invention is not limited to these examples. It is apparent to those skilled in the art that variations or modifications may be conceived within the scope described in the claims, and it is understood that the variations or modifications naturally fall within the technical scope of the present invention. In addition, the components according to the embodiment described above may be freely combined without departing from the spirit of the present invention.

The present application is based on a Japanese patent application filed on Mar. 4, 2022 (Japanese Patent Application No. 2022-033195), and the contents thereof are incorporated herein by reference.

INDUSTRIAL APPLICABILITY

The present disclosure is applicable to a manufacturing industry of an electric vehicle (an electric vehicle, a hybrid vehicle, a plug-in hybrid vehicle), and is also applicable to a manufacturing industry of a control device mounted on the electric vehicle.

REFERENCE SIGNS LIST

1: vehicle (electric vehicle)
2: motor
3: battery
4: engine
5: generator
6: clutch
7: vehicle speed sensor
8: brake sensor
9: accelerator sensor
10: control device
11: setting unit

12: calculation unit
13: control unit
A: duration time of regeneration power generation
B: time until start of transition calculation
C: predetermined time (maximum time of short time SOP)
D: transition time (execution time of transition calculation)
$E_1$: time (time until change of multiplication coefficient for reduction $k_1$, $k_2$ to 0.5 in transition calculation)
$E_2$: time (time until stop of change of multiplication coefficient for reduction $k_1$, $k_2$ in transition calculation)
$k_1$ to $k_3$: multiplication coefficient for reduction
$t_0$ to $t_3$: time point

The invention claimed is:

1. A control device for an electric vehicle on which a motor is mounted, the motor having both a function of driving wheels with power of a battery and a function of charging the battery with power generated by regeneration power generation, the control device comprising:

a setting unit configured to set, as a maximum value of power capable of being charged into the battery, a short time State Of Power (SOP) applied during charging in which a charging time is equal to or less than a predetermined time and a long time SOP applied during charging in which the charging time exceeds the predetermined time and having a value smaller than the short time SOP;

a calculation unit configured to calculate a regeneration SOP corresponding to a maximum value of regeneration power from the motor based on the short time SOP and the long time SOP; and a control unit configured to control the regeneration power from the motor in a range equal to or less than the regeneration SOP, wherein the calculation unit is configured to execute a transition calculation of gradually changing the regeneration SOP from the short time SOP to the long time SOP in accordance with a duration time of the regeneration power generation.

2. The control device for the electric vehicle according to claim 1, wherein the calculation unit is configured to start the transition calculation before the duration time of the regeneration power generation reaches the predetermined time.

3. The control device for the electric vehicle according to claim 1, wherein the calculation unit is configured to linearly change a ratio of the short time SOP or a ratio of the long time SOP that are reflected in the regeneration SOP with respect to the duration time of the regeneration power generation in the transition calculation.

4. The control device for the electric vehicle according to claim 3, wherein the calculation unit is configured to calculate the regeneration SOP based on the following Equation 1:

$$\text{regeneration } SOP = \hspace{3cm} \text{Equation 1}$$
$$(1 - k_1) \times (\text{short time } SOP) + k_1 \times (\text{long time } SOP)$$

where, $k_1$: a multiplication coefficient for reduction increasing in proportion to an execution time of the transition calculation, $0 \leq k_1 \leq 1$).

5. The control device for the electric vehicle according to claim 4, wherein the calculation unit is configured to set a time from a start of the regeneration power generation until a start of the transition calculation and a time change rate of the multiplication coefficient for reduction $k_1$ in accordance with an operation state of the battery or a traveling state of the electric vehicle.

6. The control device for the electric vehicle according to claim 3, wherein the calculation unit is configured to match the ratio of the short time SOP reflected in the regeneration SOP and the ratio of the long time SOP reflected in the regeneration SOP at a time point when the duration time of the regeneration power generation reaches the predetermined time.

\*     \*     \*     \*     \*